US009247690B1

(12) United States Patent
Awad

(10) Patent No.: US 9,247,690 B1
(45) Date of Patent: Feb. 2, 2016

(54) COMBINED LEAF BLOWER/VACUUM

(71) Applicant: Rimon Awad, West Babylon, NY (US)

(72) Inventor: Rimon Awad, West Babylon, NY (US)

( * ) Notice: Subject to any disclaimer, the term of this patent is extended or adjusted under 35 U.S.C. 154(b) by 0 days.

(21) Appl. No.: 14/659,725

(22) Filed: Mar. 17, 2015

(51) Int. Cl.
*A47L 9/06* (2006.01)
*A01G 1/12* (2006.01)
*A47L 5/14* (2006.01)

(52) U.S. Cl.
CPC .. *A01G 1/125* (2013.01); *A47L 5/14* (2013.01)

(58) Field of Classification Search
CPC ................................ A47L 5/14; A01G 1/125
USPC ............................................ 15/344, 345, 405
IPC ........................................................ A47L 9/06
See application file for complete search history.

(56) References Cited

U.S. PATENT DOCUMENTS

| 5,035,586 | A | | 7/1991 | Sadler |
| 5,245,726 | A | * | 9/1993 | Rote ........................ A47L 5/24 15/339 |
| D349,983 | S | | 8/1994 | Tuggle |
| 5,621,945 | A | * | 4/1997 | Howells ................. A01G 1/125 15/339 |
| 5,638,574 | A | | 6/1997 | Haupt |
| 5,707,017 | A | | 1/1998 | Paolucci |
| 8,266,763 | B1 | | 9/2012 | Hays |
| 8,365,350 | B2 | | 2/2013 | Cochran |
| 2007/0209346 | A1 | | 9/2007 | Bovo |
| 2008/0110026 | A1 | * | 5/2008 | Marcoe ................... A01G 1/125 30/124 |
| 2009/0083933 | A1 | * | 4/2009 | Takeda ................... F04D 29/703 15/344 |
| 2011/0297765 | A1 | * | 12/2011 | Tulipani ................. A01G 1/125 241/18 |
| 2013/0205536 | A1 | | 8/2013 | Robichaux |

FOREIGN PATENT DOCUMENTS

WO    WO 9703597    2/1997

* cited by examiner

*Primary Examiner* — David Redding
(74) *Attorney, Agent, or Firm* — Kyle A. Fletcher, Esq.

(57) ABSTRACT

The combined leaf blower/vacuum includes a nozzle affixed to a housing. A secondary hose extends between the housing and a collection bag. The housing includes a motor and impeller that is in fluid communication with the nozzle and an outlet. The impeller is able to create wind that is expelled via the nozzle. The wind created via the impeller is adapted to blow leaves and lawn debris via the nozzle. Conversely, the motor is able to reverse the direction of the impeller, and upon which shall form a vacuum at the nozzle. A mulching member is located adjacent the motor, and is responsible for mulching up the leaves and lawn debris immediately before exiting the housing, and transferring via the secondary hose to the collection bag.

12 Claims, 3 Drawing Sheets

COMBINED LEAF BLOWER/VACUUM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of leaf blower and vacuums, more specifically, a device that is able to operate as a leaf blower or as a vacuum that will mulch up leaves.

SUMMARY OF INVENTION

The combined leaf blower/vacuum includes a nozzle affixed to a housing. A secondary hose extends between the housing and a collection bag. The housing includes a motor and impeller that is in fluid communication with the nozzle and an outlet. The impeller is able to create wind that is expelled via the nozzle. The wind created via the impeller is adapted to blow leaves and lawn debris via the nozzle. Conversely, the motor is able to reverse the direction of the impeller, and upon which shall form a vacuum at the nozzle. The use of a vacuum at the nozzle is adapted to collect leaves and other lawn debris, and which is then converted into mulch, and transferred over to the collection bag via the secondary hose. A mulching member is located adjacent the motor, and is responsible for mulching up the leaves and lawn debris immediately before exiting the housing, and transferring via the secondary hose to the collection bag. The motor is optionally powered via electricity or gas. The collection bag includes an inlet as well as a plurality of small holes. The collection bag includes a zipper that enables the collection bag to fully open in order to extract the collected debris collected therein.

These together with additional objects, features and advantages of the combined leaf blower/vacuum will be readily apparent to those of ordinary skill in the art upon reading the following detailed description of the presently preferred, but nonetheless illustrative, embodiments when taken in conjunction with the accompanying drawings.

In this respect, before explaining the current embodiments of the combined leaf blower/vacuum in detail, it is to be understood that the combined leaf blower/vacuum is not limited in its applications to the details of construction and arrangements of the components set forth in the following description or illustration. Those skilled in the art will appreciate that the concept of this disclosure may be readily utilized as a basis for the design of other structure, methods, and systems for carrying out the several purposes of the combined leaf blower/vacuum.

It is therefore important that the claims be regarded as including such equivalent construction insofar as they do not depart from the spirit and scope of the combined leaf blower/vacuum. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
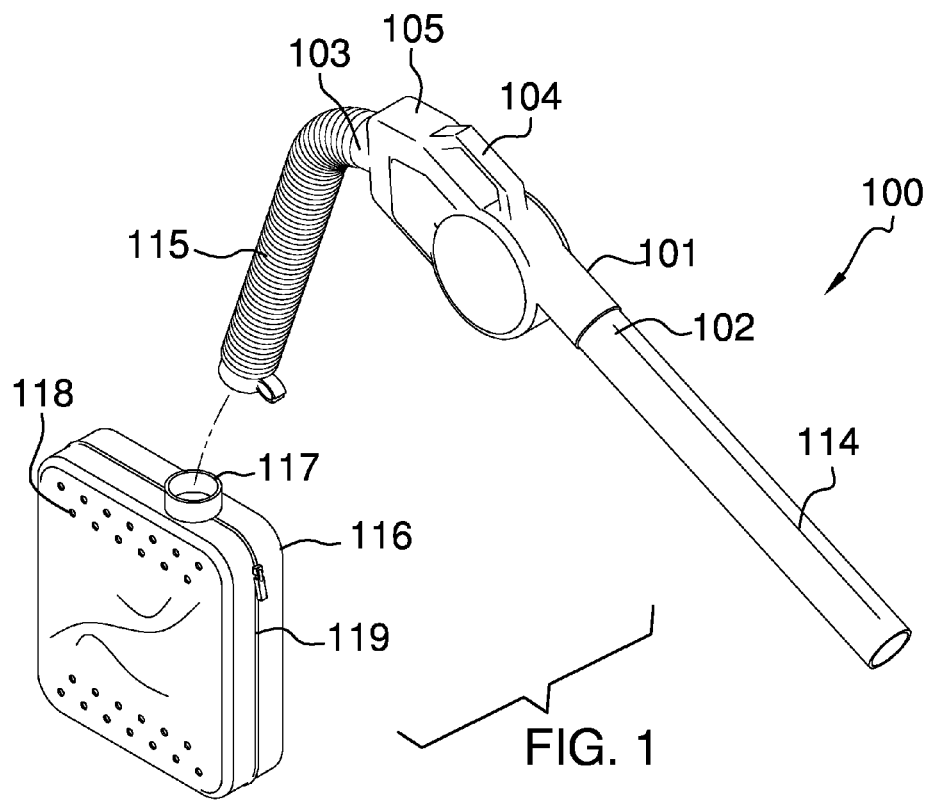
FIG. 1 is a perspective view of an embodiment of the disclosure.
Figure 2:
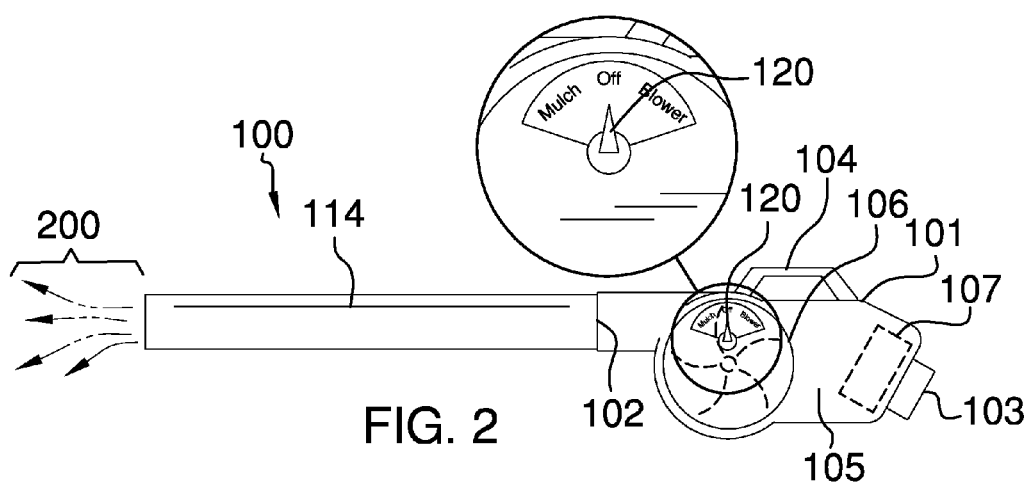
FIG. 2 is a side view of an embodiment of the disclosure.
Figure 3:
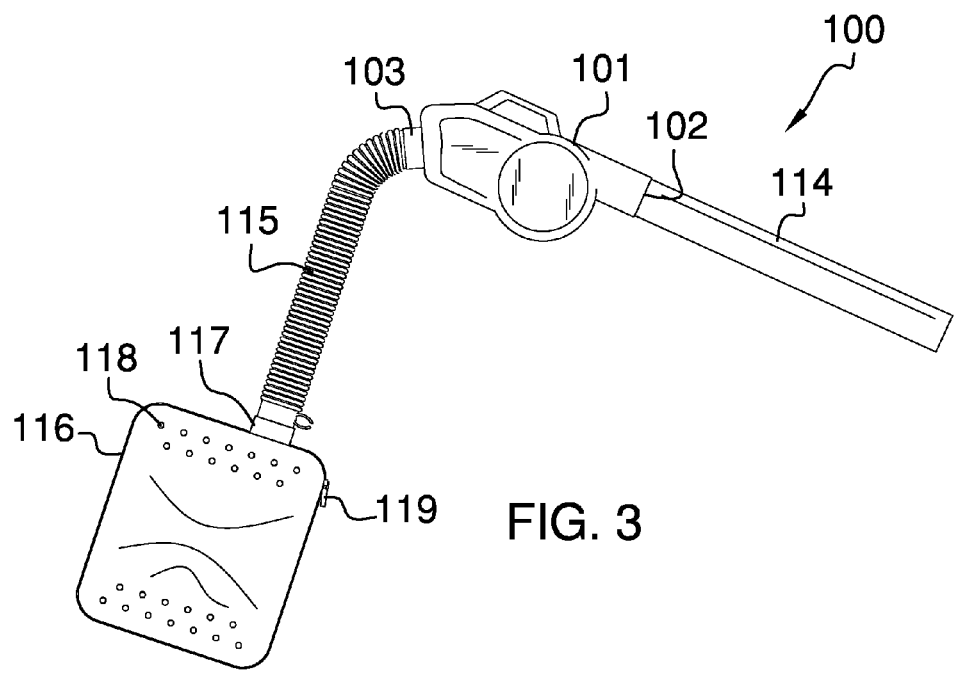
FIG. 3 is another side view of an embodiment of the disclosure.
Figure 4:
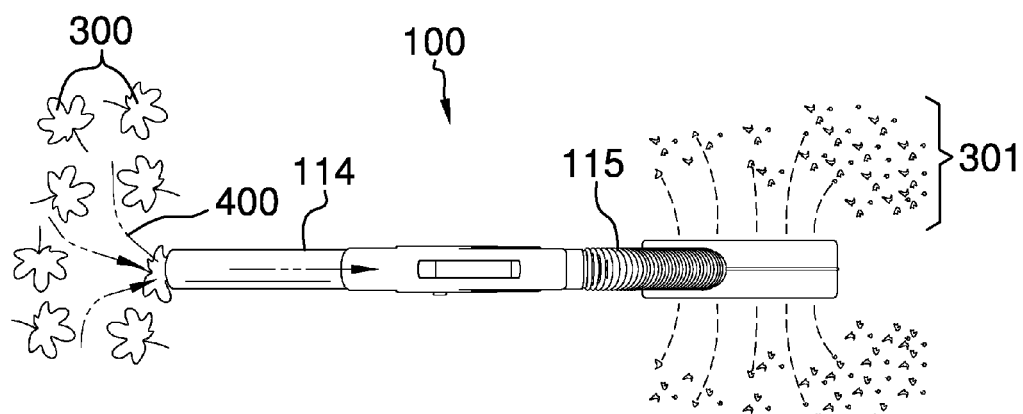
FIG. 4 is a top view of an embodiment of the disclosure.
Figure 5:
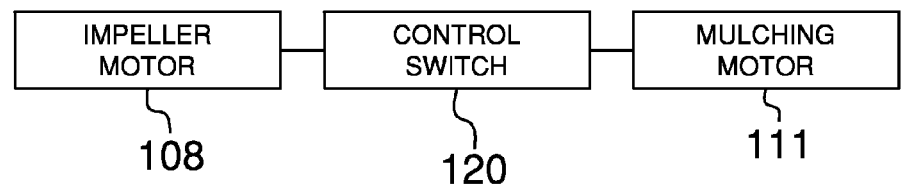
FIG. 5 is a block diagram of the componentry associated with an embodiment of the disclosure.
Figure 6:
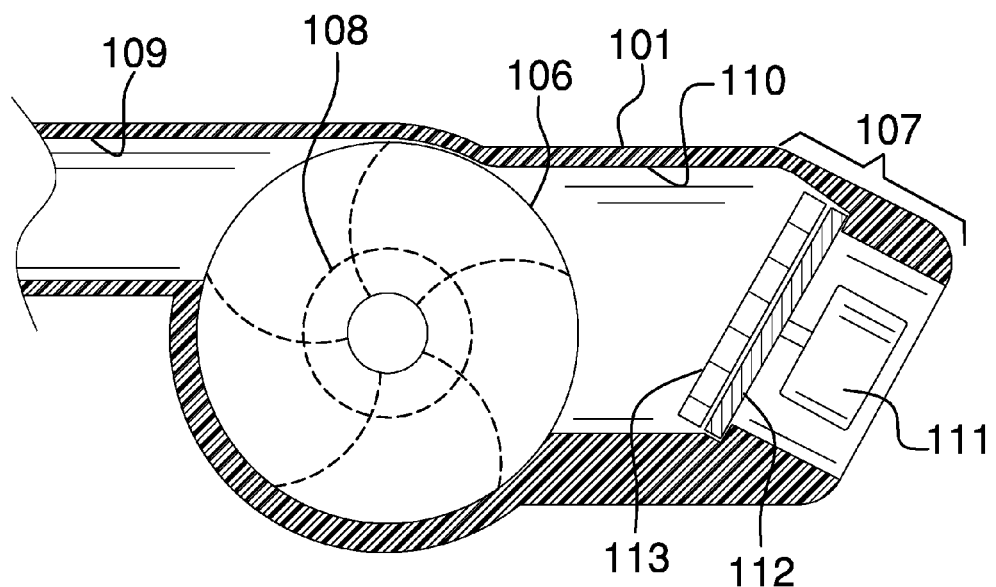
FIG. 6 is a cross-sectional view of a housing portion of an embodiment of the disclosure.

Detailed reference will now be made to a first potential embodiment of the disclosure, which is illustrated in FIGS. 1 through 6. The combined leaf blower/vacuum 100 (hereinafter invention) comprises a housing 101 that is further defined with a first inlet 102 and a second outlet 103. The housing 101 includes a handle 104 that extends from an exterior surface 105. The housing 101 is of hollowed construction, and includes an impeller 106 therein. Moreover, the housing 101 includes a mulching member 107 therein. The impeller 106 is located adjacent the first inlet 102; whereas the mulching member 107 is located adjacent the second outlet 103.

The impeller 106 is driven via an impeller motor 108. The impeller motor 108 is capable of rotating the impeller 106 either clockwise or counterclockwise. The housing 101 includes an impeller duct 109 that extends from the first inlet 102 directly to the impeller 106. The housing 101 also includes an intermediate duct 110 that extends from the impeller 106 over to the mulching member 107. The mulching member 107 is driven via a mulching motor 111. The mulching member 107 is further defined with a rotating blade 112 and a stationary blade 113. The rotating blade 112 rotates via the mulching motor 111 in order to produce a shearing action between the rotating blade 112 and the stationary blade 113. Both the rotating blade 112 and the stationary blade 113 are located adjacent to the intermediate duct 110. The mulching motor 111 is adjacent to the second outlet 103.

The first inlet 102 is affixed to a nozzle 114. The nozzle 114 extends forward of the housing 101, and is responsible for distributing accelerated air (wind) 200 or collecting leaves and lawn debris 300 via a vacuum 400. The use of the invention 100 as a leaf blower requires the impeller motor 108 to create the accelerated air 200, which is dispensed via the nozzle 114. The use of the invention 100 as a mulcher requires the impeller motor 108 to rotate in reverse of use as a leaf blower. Moreover, the use of the invention 100 as a mulcher requires both the impeller motor 108 to rotate in reverse, but also requires use of the mulching member 107.

When the invention 100 is in use as a mulcher, the second outlet 103 is connected to a second hose 115. The second hose 115 is flexible, and interfaces between the housing 101 and a collection bag 116. The second hose 115 is of an undefined length, and the collection bag 116 is a box-like object made of flexible materials. The collection bag 116 is adapted to collect mulched lawn debris 301. The mulched lawn debris 301 is the resulting product of the leaves and lawn debris 300 passing through the mulching member 107.

The collection bag 116 is further defined with a collection inlet 117 that is secured to the second hose 115. The collection bag 116 also includes a plurality of collection holes 118, which enable movement of air. The collection bag 116 also includes a zipper member 119 that enables the collection bag 116 to be fully opened in order to extract the collected mulched lawn debris 301.

The housing 101 also includes a control switch 120. The control switch 120 is wired to both the impeller motor 108 as well as the mulching motor 111. The control switch 120 controls whether the invention 100 is used as a leaf blower or as a mulcher. The control switch 120 is able to control whether the mulching motor 111 is turned on or off, as well as to control the direction of the impeller motor 108. It shall be noted that the impeller motor 108 and the mulching motor 111 may be gas-powered or electrical. The use of gas-powered engines and electrical motors are well known in the field pertaining to lawn and gardening equipment and tools.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A combined leaf blower/vacuum comprising:
   a housing into which an impeller and a mulching member are provided;
   wherein the impeller is provided to create accelerate air or a vacuum;
   wherein the mulching member is only in use when said vacuum is formed via the impeller;
   wherein the housing is adapted to dispense accelerate air to vacuum up leaves or lawn debris, which is adaptively turned into mulched leaves and lawn debris via the mulching member;
   wherein the housing is further defined with a first inlet and a second outlet; wherein the housing includes a handle that extends from an exterior surface; wherein the housing is of hollowed construction, and includes said impeller as well as said mulching member;
   wherein the impeller is located adjacent the first inlet; wherein the mulching member is located adjacent the second outlet;
   wherein the impeller is driven via an impeller motor; wherein the impeller motor is capable of rotating the impeller either clockwise or counterclockwise;
   wherein the housing includes an impeller duct that extends from the first inlet directly to the impeller;
   wherein the housing also includes an intermediate duct that extends from the impeller over to the mulching member.

2. The combined leaf blower/vacuum according to claim 1 wherein the mulching member is driven via a mulching motor; wherein the mulching member is further defined with a rotating blade and a stationary blade.

3. The combined leaf blower/vacuum according to claim 2 wherein the rotating blade rotates via the mulching motor in order to produce a shearing action between the rotating blade and the stationary blade.

4. The combined leaf blower/vacuum according to claim 3 wherein both the rotating blade and the stationary blade are located adjacent to the intermediate duct; wherein the mulching motor is adjacent to the second outlet.

5. The combined leaf blower/vacuum according to claim 4 wherein the first inlet is affixed to a nozzle;
   wherein the nozzle extends forward of the housing, and is responsible for distributing accelerated air or collecting leaves and lawn debris via said vacuum.

6. The combined leaf blower/vacuum according to claim 5 wherein the second outlet is connected to a second hose.

7. The combined leaf blower/vacuum according to claim 6 wherein the second hose is flexible, and interfaces between the housing and a collection bag; wherein the second hose is of an undefined length, and the collection bag is a box-like object.

8. The combined leaf blower/vacuum according to claim 7 wherein the collection bag is adapted to collect mulched lawn debris.

9. The combined leaf blower/vacuum according to claim 8 wherein the collection bag is further defined with a collection inlet that is secured to the second hose.

10. The combined leaf blower/vacuum according to claim 9 wherein the collection bag also includes a plurality of collection holes, which enable movement of air.

11. The combined leaf blower/vacuum according to claim 10 wherein the collection bag also includes a zipper member that enables the collection bag to be fully opened in order to extract the collected mulched lawn debris.

12. The combined leaf blower/vacuum according to claim 11 wherein the housing includes a control switch; wherein the control switch is wired to both the impeller motor as well as the mulching motor; wherein the control switch controls whether the mulching motor is turned on or off, as well as to control the direction of the impeller motor.

* * * * *